Oct. 28, 1952     W. T. BLAKE     2,615,534
HYDRAULIC CONTROL FOR MECHANISMS
Filed Feb. 1, 1949     2 SHEETS—SHEET 1
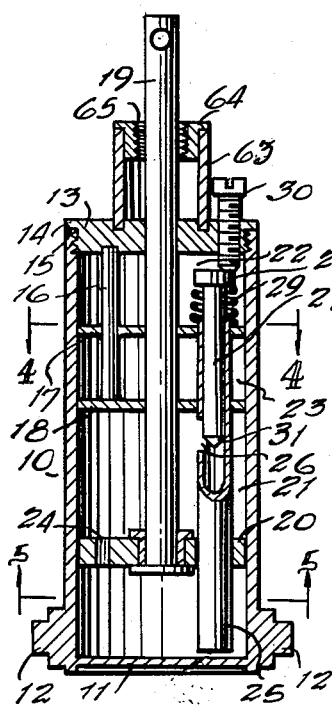
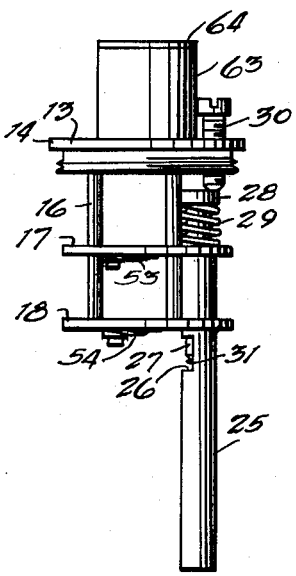
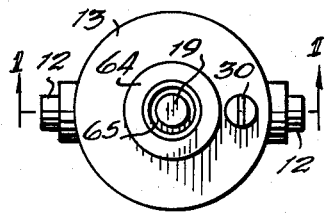
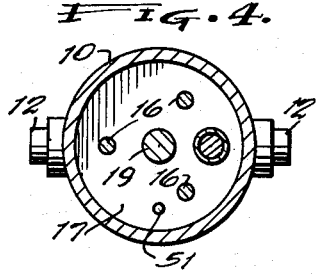
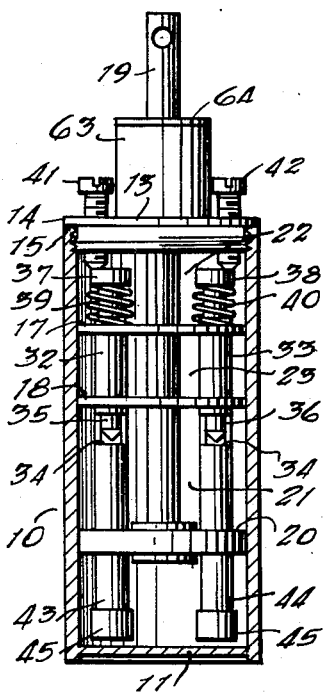
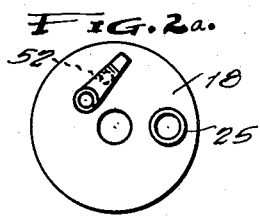
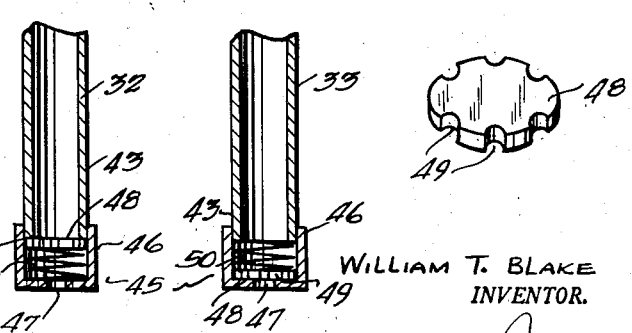
WILLIAM T. BLAKE
INVENTOR.
BY Cecil L. Wood
ATTORNEY Oct. 28, 1952 W. T. BLAKE 2,615,534
HYDRAULIC CONTROL FOR MECHANISMS
Filed Feb. 1, 1949 2 SHEETS—SHEET 2

WILLIAM T. BLAKE
INVENTOR.

BY Cecil L. Frod

ATTORNEY

Patented Oct. 28, 1952

2,615,534

UNITED STATES PATENT OFFICE 2,615,534

HYDRAULIC CONTROL FOR MECHANISMS

William Thomas Blake, Fort Worth, Tex.

Application February 1, 1949, Serial No. 73,879

5 Claims. (Cl. 188—96)

This invention relates to shock absorbing cushioning or checking devices for such mechanisms as adding and calculating machines, and the like, to be installed between such mechanisms and the prime mover therefor, or between any cooperating parts or mechanisms subject to compensatory or reciprocating movements with respect to each other, and the principal object of the invention resides in the provision of a fluid control device which embodies certain novel adjustable features by which relatively finite precision can be accomplished in the action of such mechanisms.

Another object of the invention is that of providing a control device for adding machines of all standard brands and different sizes which is capable of functioning as original or replacement controls on such machines and installed by persons not necessarily skilled in the mechanics thereof, and which has embodied therein simplified adjustments enabling the service man or operators of such machines to make such adjustments as may be desirable to insure the proper function of the machine under all circumstances and conditions.

A still further object of the invention resides in the provision of a control device which affords simple adjustments for the movement of the operating mechanism of adding machines, as the beginning and ending of the travel of the stroke required for such movement, which usually imposes greater shock upon the parts than the movement required in the actual mechanical operations necessary to register the calculations, and affording means whereby efficient operating speeds may be provided in such machines while effecting the desired cushioning or deterrent at the critical points of operation.

An object of the invention is that of providing a hydraulic shock absorbing, or control mechanism which is peculiarly adapted to application for use on automotive and railway equipment, affording an efficient means for alleviating road shocks and the tortional movements of motor vehicles on roadways and railway cars along roadbeds. The unique design of the internal valve mechanism of the invention renders the same especially adaptable to such uses.

Broadly, the invention contemplates the provision of a control mechanism having relief values therein capable of independent adjustment whereby the movement of the piston, resisted in its movement by the hydraulic fluid, can be caused to function at variable speeds in both directions of travel and selectively adjusted to present controls where these are most desirable.

While the foregoing objects are paramount other and lesser objects will become manifest as the description proceeds, taken in connection with the appended drawings wherein:

Figure 1 is a longitudinal cross-sectional view of the invention taken on lines 1—1 of Figure 3, showing the plural arrangement of compartments, the piston and adjustable relief valve.

Figure 2 is an elevational view of the internal parts of the invention, including one form of relief valve.

Figure 2a is an inverted plan view of the internal parts of the invention as shown in Figure 2.

Figure 3 is a plan view of the invention.

Figure 4 illustrates the invention in transverse section, taken on lines 4—4 of Figure 1.

Figure 5 is another transverse cross-sectional view, taken on lines 5—5 of Figure 1.

Figure 6 is a partial longitudinal cross-sectional view of the invention showing the internal parts in elevation and illustrating a plurality of adjustable valves.

Figure 7 is a fragmentary longitudinal cross-sectional illustration of one of the valve tubes showing the interchangeable check valve in one position.

Figure 8 is a fragmentary longitudinal cross-sectional illustration of one of the valve tubes showing the interchangeable check valve in the opposite position.

Figure 9 is a perspective view of the closure employed in the check valves shown in Figures 7 and 8.

Figure 10:
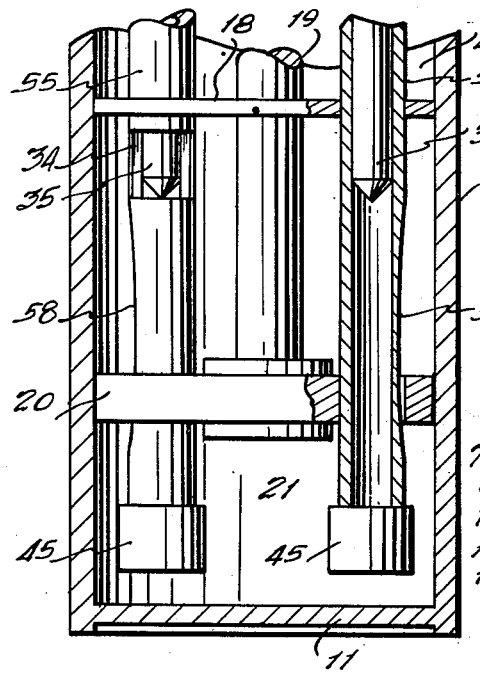
Figure 10 is another fragmentary partial cross-sectional view illustrating the lower end of the internal parts showing the association of the piston and a modified form of the valve tubes in the lower end of the casing.

The invention comprises a cylindrical casing 10 which is preferably provided with an integrally closed end 11 at which is formed a pair of diametrically opposed integral lugs 12 projecting from each side of the casing 10, as illustrated in Figures 1, 3 and 4, by which the assembly is pivotally connected into the mechanism, such as an adding machine, or the like, by a clevis or other device (not shown).

The opposite end of the casing 10 is closed by a circular plate 13 which is circumferentially threaded and has a flange 14 engageable with the rim 15 of the casing 10, in the manner shown in Figures 1, 2 and 6. Integrally secured to the inner side of the plate 13 are a plurality of spacers 16 which extend axially into the casing 10 and function to support a plurality of circular plates 17 and 18 which are spaced apart in the manner illustrated in Figures 1, 2 and 6.

The cover plate 13, as well as each of the plates 17 and 18, are centrally apertured to slidably accommodate the stem 19 of a piston 20 which operates in the compartment 21 in the closed end of the casing 10, or opposite the closure plate 13. It will become apparent, by reference to Figures 1 and 6, that the plates 17 and 18 are spaced inwardly from the cover plate 13 so that a plurality of chambers 22 and 23 are defined between the plate 13 and the plate 17 and between the latter and its companion plate 18, the compartment 21 being formed between the latter and the closed end 11 of the casing 10.

A prime function of the invention is that of providing a hydraulic governor or control device for checking the action of the operating mechanism of an adding machine, or the like, particularly at one or both ends of the stroke of the operating arms of both manual or automatic machines. At either stage of the operation there occurs an objectional shock which has an undesirable effect upon the parts. The movement of the piston 20 in the hydraulic fluid within the casing 10 must be capable of relatively accurate control to accomplish the proper control of the mechanism in which the invention is connected.

It is desirable, therefore, that in addition to the provision of one or more orifices 24 through the piston 20, affording a by-pass for the fluid therethrough, a more accurate control medium be provided which is capable of adjustment exteriorly of the casing 10. A valve assembly is embodied in the invention having a readily accessible and easily manipulated adjustment by which the movement of the piston 20 can be made faster or impeded as desired.

The valve assembly may, as necessity or expediency requires, be provided singly or in multiples, as illustrated in Figures 1, 2, 6 and 10, and as will presently become apparent as the description proceeds. It is conventional practice to afford by-pass orifices 24 in the piston 20 of diameters usually determined in accordance with the type of mechanism the device is to be attached and the size of the job it is required to accomplish. Such an arrangement is desirable but when employed alone it is not satisfactory since the action of the piston often varies with the density or gravity of the fluid used, or the capacity of the device is not suited to the machine to which it is attached necessitating the provision of larger or smaller orifices.

Other undesirable factors encountered in the use of fixed orifices in the piston alone are those concerned with repair and maintenance or replacement, such as the loss of time and expense involved in the necessity for dismantling the device in order to change the diameters of the orifices when it is desirable to change the speed of the piston in its movement through the fluid and the requirement for the provision of governors of different sizes for different types and sizes of machines. Usually the size of the orifices must be determined by experimentation, on well used machines, and it is very difficult to accurately effect the necessary adjustments.

As previously indicated, the most important functions of an adding machine occur at the beginning and at the end of the operating stroke. After these have taken place there is a period of travel between the beginning and end of the travel of the operating levers where increased speed is not objectionable, and may even be desirable. The invention is designed to accomplish such a provision by the flexibility of the adjustable by-pass valves.

It is contemplated that when it is desirable to cushion the stroke of the machine in only one direction a single valve, such as the arrangement shown in Figures 1 and 2, is provided and which comprises a tube 25 arranged through the plates 17 and 18 and the piston 20. The tube 25 terminates at one end within the chamber 22 and at its opposite end near the closed end 11 of the casing 10 in the chamber 21. An opening 26 is formed in the tube 25 near the plate 18 and between the latter and the piston 20, as shown in Figures 1 and 2.

A longitudinally adjustable stem 27 is arranged in the tube 25 and has a head 28 formed on its outer end. A spring 29 is arranged about the stem 27 between the head 28 and the plate 17 tending to urge the stem 27 out of the tube 25. An adjusting screw 30 is threaded through the cover plate 13 and bears upon the head 28 in such a manner as to provide means for urging the stem 27 inwardly to regulate the passage of the hydraulic fluid through the opening 26 under the pressure of the piston 20. The inner end 31 of the stem 27 is tapered or conical to more accurately control the flow of fluid through the opening 26.

A dual arrangement of by-pass valves may be provided to control the speed of the piston 20 in either direction, such as upwardly or downwardly, although the assembly is designed to be operated in any position. This form of the invention is illustrated in Figures 6 and 10 and comprises a pair of tubes 32 and 33 arranged in the same maner in which the tube 25 is positioned in the structure shown in Figures 1 and 2. Each tube 32 and 33 has an opening 34 therein similar to the opening 26 in the tube 25 and in the same positions with respect to the plate 18 and the piston 20, the latter embracing the tubes 32 and 33 as in Figure 6.

Each of the tubes 32 and 33 has a stem 35 or 36 slidably arranged therein and each has a head 37 or 38. A spring 39 or 40 is arranged about each of the stems 35 and 36 and these bear against the heads 37 and 38 to provide tensions thereon against the pressure of adjusting screws 41 and 42 threaded through the cover plate 13 and engaging the heads 37 and 38 by which the stems 35 and 36 are adjusted with respect to the openings 34 in the tubes 32 and 33. The lower ends 43 and 44 of the stems 35 and 36 are also conical or tapered.

It is expedient to provide a check valve 45 which is reversible and capable of arrangement upon each of the inner ends of the tubes 32 and 33 near the closed end 11 of the casing 11, as illustrated in Figures 6, 7 and 8. The valve 45 comprises a cup 46, having a port 47 therein, which is fitted on the inner ends of the tubes 32 or 33, in the manner shown in Figures 7 and 8, and has a circular closure 48 capable of closing the port 47 or the inner end of one of the tubes 32 or 33, depending upon the direction of the flow of the fluid in the chamber 21.

The closure 48 is illustrated in detail in Figure 9 and has a series of notches 49 formed about its periphery for the passage of fluid thereby when in neutral or open position. A spring 50 is placed in the cup 46 and is arranged to bear against the closure 48 to urge the same inwardly against the end of the tube or outwardly against the closed end of the cup and to close the port 47. It is apparent, therefore, that very accurate adjustments may be accomplished through the medium of the screws 41 and 42 to regulate the flow of the hydraulic fluid past the piston 20 in either direction of travel. The adjustments can be accomplished by the operator of the machine to any speed desired.

In extended periods of operation the fluid in the casing 10 will tend to migrate from the chamber 21 first into the chamber 23, and then into the chamber 22, past the valve stem 19 under pressure of the latter and occasioned by a slight vacuum occurring in the chambers 22 and 23. However, a vacuum will also occur in the chamber 21 to draw the fluid back into this chamber when the mechanism is permitted to remain idle for any period. To expedite the return of fluids to the chamber 21 ports 51 and 52 are provided in the plates 17 and 18 having check valves 53 and 54 therein, as shown in Figures 2 and 2a. The reed-type of check valve is preferred although other arrangements may be resorted to if desired. Such devices will permit the back flow of fluids into the chamber 21, aided by the vacuum therein, and prevent migration through the ports 51 and 52 from the chamber 21 except around the stem 19 which is minimized.

Figure 11:
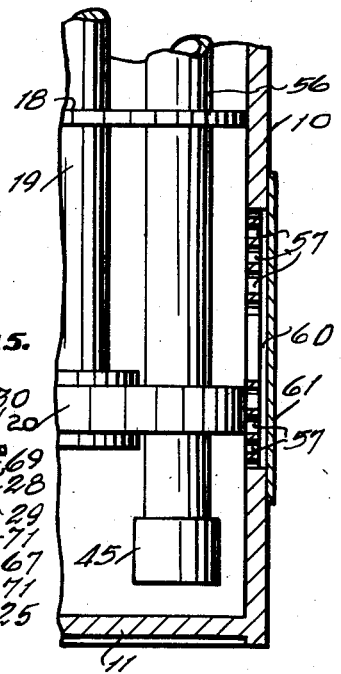
Figure 11 is a fragmentary cross-sectional view of the lower end of the invention showing the piston and a fluid by-pass arranged in the casing wall.
Figure 12:
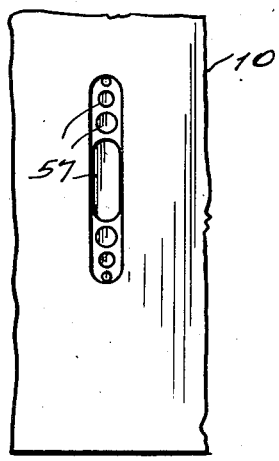
Figure 12 is an internal elevational view of another fluid by-pass in the wall of the housing, the latter being fragmentarily shown.

Other by-pass arrangements can be provided for the fluid past the piston 20 as by the reduced diameter tubes 55 and 56, shown in Figure 10, or by the by-pass ports 57 illustrated in Figures 11 and 12. The tubes 55 and 56 are formed with reduced portions 58 and 59 along one side and of such length and inclinations as to cause gradually increased or decreased openings about the tubes 55 and 56 as the piston 20 is reciprocated, the openings being gradually reduced to closing toward each end of the piston stroke permitting the maximum fluid passage during a brief period while the piston 20 is intermediate the ends of its stroke.

Figure 13:
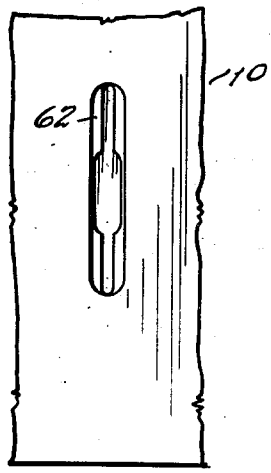
Figure 13 is an external elevational view of the enclosed by-pass shown in Figure 12, the casing being illustrated fragmentarily.
Figure 14:
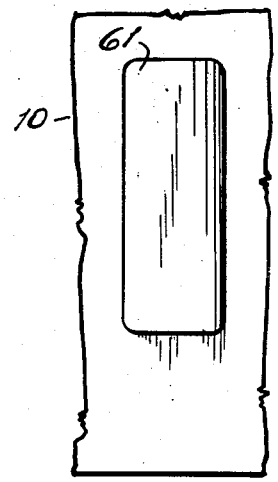
Figure 14 is an external elevational view of the fluid by-pass shown in Figure 11 and illustrating the casing fragmentarily.

The valve stems 35 and 36 are also provided in the tubes 55 and 56 to cooperate with the openings 34 to further regulate the flow of fluid past the piston 20. These are adjustable in the same manner as those shown in Figures 1, 2 and 6. The by-pass ports 57 arranged in the walls of the casing 10, as illustrated in Figures 11 and 12, comprise one or a plurality of openings communicating with a slot 60 formed externally of the casing 10 and enclosed by a cover plate 61 or 62, shown in Figure 13 or 14. The arrangement of ports extend longitudinally of the path of the piston 20 and, by reason of the successively reduced diameter orifices 57 toward each end, permits the fluid to gradually flow past the piston 26, slowly at first, then faster until the maximum passage occurs, then gradually reducing the flow until it is finally cut off at the opposite end of the piston stroke.

A cylindrical closure 63 is integrally secured to the cover plate 13 and concentrically embraces the piston stem 19 exteriorly of the casing 10. This member has a flanged cap or collar 64 at its upper end having an aperture 65 therethrough to accommodate the stem 19. The aperture is interiorly threaded to receive a plug applied when the assembly is assembled and is allowed to remain until the installation of the device.

The closure 63 is designed to provide a receptacle for any fluid passing out of the casing 10 during operations and retaining the same until it is drawn back into the casing 10 by vacuum. The casing 10 can be filled by removing any of the adjusting screws 30, 41 and 42.

Figure 15:
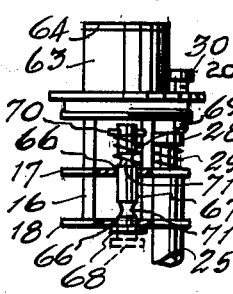
Figure 15 illustrates, in elevation, a modified form of the relief valve for the ports between the upper chambers and the lower chamber.

In Figure 15 is shown a form of the valve assembly of the invention in which the relief ports 66 in the plates 17 and 18 are normally closed by a stem 67 arranged through the ports and having a head 68 formed on its inner end which bears against the inner plate 18. The stem 67 has a spring 69 arranged thereon opposite the head 68 which is retained by a pin 70 in the end of the stem 67 and bears against the plate 17. The stem 67, therefore, yieldably functions to partially open the ports 66 when the swaged portions 71 are aligned with the ports 66. This arrangement corresponds with the reed valves 52 illustrated in Figures 2 and 2a.

Manifestly, the structure herein shown and described is capable of considerable modifications from time to time, by persons skilled in the art, without departing from the spirit and intent of the invention or the scope of the appended claims.

What is claimed is:

1. In a control assembly for fluids in a dash-pot having a cylindrical casing and a plurality of compartments defined by partitions, and a piston operating in one of said compartments, a valve mechanism comprising a tube arranged longitudinally of the axis of said casing and extending through said partitions and having an opening therein in the lowermost compartment above said piston and providing communication through said piston, a check valve operatively arranged in the bottom of said tube, a tensioned needle valve in said tube for controlling passage of fluids through said opening in said tube above said piston, and means in one end of said casing for adjusting said needle valve.

2. In a control mechanism for dash-pot assemblies having a cylindrical casing and a plurality of partitions therein defining separate compartments, and a piston operating in one of said compartments, a tube arranged through said partitions and said piston having an opening therein on one side of said piston, a tensioned check valve in the end of said tube on the opposite side of said piston, a stem arranged in said tube and adjustable in said opening to control fluid passage therethrough in the compartment in which said piston is operated, and means arranged in one end of said casing for adjusting said stem whereby to control fluids on each side of said piston.

3. In a control mechanism for dash-pot assemblies, having a cylindrical casing and a plurality of partitions defining a plurality of isolated compartments, and a piston operating in one of said compartments, a tube arranged through said partitions and terminating in the compartment in which said piston is operating, a check valve in said tube on one side of said piston and an opening on the opposite side of said piston, a stem in said tube terminating at said opening and capable of regulating the flow of fluids through said opening, and means on one end of said cylindrical casing for adjusting said stem to control said opening.

4. In a fluid control device for hydraulic control mechanisms having a cylindrical casing with a plurality of separate compartments and a piston operating in one of said compartments, a tube rigidly supported in said casing providing communication through said piston and having a check valve on one side of said piston and an opening on the opposite side thereof, a stem operatively arranged in said tube for controlling said opening, and a tensioned screw on one end of said casing engaging said stem for adjusting said opening to regulate the flow of fluids through said opening opposite said check valve.

5. In a fluid control device for hydraulically operated mechanisms for controlling the operations of machinery, including a cylindrical casing having a plurality of isolated compartments and a piston operating in one of said compartments, a tubular communication rigidly supported in said casing and arranged through said piston, a check valve in the inner end of said tube on one side of said piston, an opening in said tube on the opposite side of said piston, a tensioned stem in said tube adapted to control the fluid flow through said opening, and a screw on one end of said casing for adjusting said stem with respect to said opening.

WILLIAM THOMAS BLAKE.

REFERENCES CITED

The following references are of record in the file of this patent:

UNITED STATES PATENTS

| Number | Name | Date |
|---|---|---|
| 999,871 | Rector | Aug. 8, 1911 |
| 1,164,371 | Lovejoy | Dec. 14, 1915 |
| 2,031,826 | Ekstromer | Feb. 25, 1936 |

FOREIGN PATENTS

| Number | Country | Date |
|---|---|---|
| 29,906 | Great Britain | Dec. 11, 1913 |
| 199,299 | Great Britain | June 21, 1923 |